United States Patent [19]

Kimura et al.

[11] Patent Number: 5,719,685
[45] Date of Patent: Feb. 17, 1998

[54] DIGITAL COPYING MACHINE

[75] Inventors: Youichi Kimura, Nabari; Yasuhiro Nakai, Soraku-gun, both of Japan

[73] Assignee: Sharp Kabushiki Kaisha, Osaka, Japan

[21] Appl. No.: 791,990

[22] Filed: Jan. 31, 1997

Related U.S. Application Data

[63] Continuation of Ser. No. 409,539, Mar. 24, 1995, abandoned, which is a continuation of Ser. No. 88,481, Jul. 7, 1993, abandoned.

[30] Foreign Application Priority Data

Jul. 9, 1992 [JP] Japan .................. 4-182282

[51] Int. Cl.$^6$ .............. H04N 1/00; H04N 1/393
[52] U.S. Cl. .................. 358/401; 358/451
[58] Field of Search ............... 358/400, 401, 358/403, 448, 449, 451; 395/164

[56] References Cited

U.S. PATENT DOCUMENTS

| 5,051,843 | 9/1991 | Hayashi | 358/450 |
| 5,255,364 | 10/1993 | Hirose | 395/164 |

FOREIGN PATENT DOCUMENTS

| 0 369 821 A2 | 5/1990 | European Pat. Off. | N04N 1/00 |
| 0 435 174 A2 | 7/1991 | European Pat. Off. | H04N 1/387 |
| 0 460 630 A2 | 11/1991 | European Pat. Off. | H04N 1/32 |
| 2 648 657 | 12/1990 | France | H04N 1/40 |
| 4-100371 | 4/1992 | Japan . | |

*Primary Examiner*—Thomas D. Lee
*Assistant Examiner*—Jerome Grant, II
*Attorney, Agent, or Firm*—David G. Conlin; Brian L. Michaelis

[57] ABSTRACT

A digital copying machine of this invention provides a facsimile apparatus, a memory for storing data received by the facsimile apparatus having a capacity for storing a plurality of items of data, and a printer apparatus for selectively printing the data corresponding to only a cover page, contained in all the data items stored in the memory. The printer apparatus includes setting means for automatically setting a scale factor and performing synthetic printing when the data corresponding to only a cover page is output. The setting means includes calculating means for deriving an output scale factor based on the number of stored data items, and the size of paper. And the printer apparatus includes printing means for printing the data corresponding to only a cover page on two or more sheets of paper if a reducing factor of said data is smaller than a predetermined value.

3 Claims, 9 Drawing Sheets

DIGITAL COPYING MACHINE

This is a continuation of application Ser. No. 08/409,539 filed on Mar. 24, 1995, now abandoned, which is a continuation of application Ser. No. 08/088,481 filed on Jul. 7, 1993, now abandoned.

BACKGROUND OF THE INVENTION

1. Field of the Invention

The present invention relates to a digital copying machine, and more particularly to the digital copying machine in which a facsimile apparatus is built.

2. Description of the Related Art

In a general digital copying machine having a facsimile apparatus, the received data is stored in a memory and is output for printing it as it is.

When data corresponding to a plurality of pages is stored in a memory, it takes a long time to output all the received data.

Further, though only one piece of data is viewed, if a plurality of pieces of data are received before the subject piece of data, it takes a considerably long time to output the subject piece of data and consumes a great deal of papers to do so.

SUMMARY OF THE INVENTION

It is therefore an object of the present invention to provide a digital copying machine having a facsimile apparatus built therein which is capable of outputting the data corresponding to only a cover paper of the received data selectively.

The present invention is characterized by including a facsimile apparatus, a memory for storing all the data received by said facsimile apparatus, and a printer apparatus for selectively printing data corresponding to only a cover page of data stored in said memory.

The printer apparatus operates to selectively print data corresponding to only a cover page of all the data stored in the memory. Hence, only a desired data is easily selected for outputting. This results in saving paper and reducing the output time and easily and quickly knowing the summary of the desired data.

Further objects and advantages of the present invention will be apparent from the following description of the preferred embodiments of the invention as illustrated in the accompanying drawings.

The printer facsimile operates to selectively print the data corresponding to only a cover page of each data item stored in the memory. Hence, it provides a capability of easily selecting only the desired data and outputting it, for the purpose of saving paper, reducing the output time, and quickly obtaining the summary of the desired data item.

BRIEF DESCRIPTION OF THE DRAWINGS

FIG. 1, which is composed of FIG. 1A and FIG. 1B are block diagrams showing an image processing unit and control systems included in a digital copying machine according to an embodiment of the present invention.

DESCRIPTION OF THE EMBODIMENT

The description will be oriented to a digital copying machine according to an embodiment of the present invention as referring to the drawings.

Figure 2:
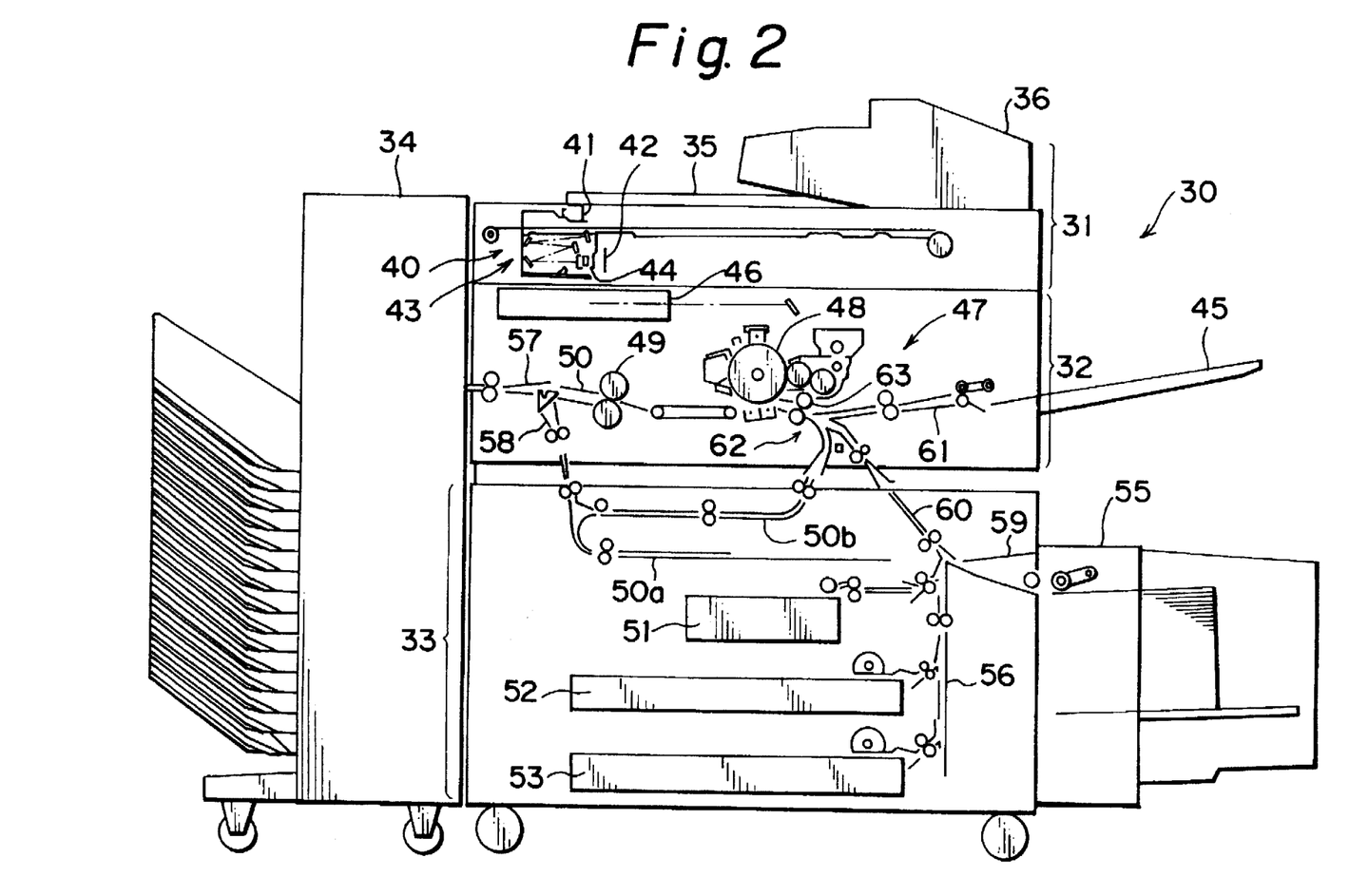
FIG. 2 is a sectional view showing an overall arrangement of a digital copying machine according to an embodiment of the present invention.

FIG. 2 is a sectional view showing the overall arrangement of the embodiment of the digital copying machine arranged to have a paper conveying device and form an image on both sides of one paper.

As shown in FIG. 2, a digital copying machine 30 provides a scanner 31, a laser printer 32, a multi-stage paper feeder 33 and a sorter 34.

The scanner 31 is arranged of a document platform 35 made of transparent glass, a reversible automatic document feeder (RDF) 36, and a scanner unit 40.

The multi-stage paper feeder 33 includes a first cassette 51, a second cassette 52, a third cassette 53, and a fourth cassette 55 to be selectively added.

The multi-stage paper feeder 33 operates to feed the papers held in the cassette at each stage from the top paper one by one and convey the paper to the laser printer 32.

The RDF 36 is arranged to automatically feed to the scanner unit 40 a plurality of papers set by one operation one by one. The scanner unit 40 operates to read one side or both sides of the paper according to an operator's selection.

The scanner unit 40 includes a lamp reflector assembly 41 for exposing the document, a plurality of reflective mirrors 43 for guiding a reflective light image from the document to a photoconductive converting element (Charge Coupled Device: CCD) 42, and a lens 44 for forming the reflective light image on the CCD 42.

To scan the document placed on the document platform 35, the scanner 31 is arranged to read the image of the document as the scanner unit 40 is traveling along the lower side of the document platform 35. In the case of using the RDF 36, the scanner 31 is arranged to read the document image as the document is being conveyed in the state that the scanner unit 40 is stopped at a predetermined location lower than the RDF 36.

The image data obtained by reading the document image through the effect of the scanner unit 40 is sent to an image processing unit in which various treatments are performed with respect to the image data. Then, the resulting image data is temporarily stored in the memory included in the image processing unit so that the image data stored in the memory may be sent to the laser printer 32 for forming an image on paper according to an indication for output.

The laser printer 32 provides a manual document tray 45, a laser writing unit 46 and an electronic photography process section 47 for forming an image.

The laser writing unit 46 includes a semiconductor laser for firing a laser beam formed according to the image data stored in the memory, a polygon mirror for deflecting the laser beam at an equal angular speed, and an f-θ lens for amending the deflected laser beam in a manner to deflect the laser beam on a photosensitive drum 48 of the electronic photography process unit 47 at an equal angular speed.

The electronic photography process unit 47 includes the photosensitive drum 48 around which a charging device, a developing device, a transfer device, a stripping device, a cleaning device, a discharging device and a fixing device 49 are located.

A convey path 50 is provided in the downward side of the conveying direction of a sheet of paper on which an image is to be formed rather than the fixing device 49. The convey path 50 is branched into a convey path 57 leading to the sorter 34 and a convey path 58 leading to a multi-stage paper feeding unit 33.

The convey path 58 is branched at the multi-stage paper feeding unit 33. As the convey path after the branch point, a reversing convey path 50a and a double side/synthesizing convey path 50b are provided.

The reversing convey path 50a is a convey path for revering a rear surface of the paper at a double side copying mode for copying both sides of one paper.

The double side/synthesizing convey path 50b is a convey path formed to convey a paper from the reversing convey path 50a to an image forming point of the photosensitive drum 48 at the double side copying mode or convey the paper to the image forming point of the photosensitive drum 48 without being reversed at a one side synthesizing copying mode for forming different images on one side of the paper for forming a image with different color toners.

The multi-stage paper feeding unit 33 includes a common convey path 56, which is constructed to convey papers from the first cassette 51, the second cassette 52, and the third cassette 53 to the electronic photography process unit 47.

The common convey path 56 is connected to the convey path 59 led from the fourth cassette 55 on the way to the electronic photography process unit 47 and then leads to a convey path 60.

The convey path 60 is formed to connect to a connecting point 62 with a convey path 61 led from the double side/synthesizing convey path 50b and the manual document tray 45 and to lead to an image forming location between the photosensitive drum 48 of the electronic photography process unit 47 and the transfer device. The connecting point 62 for connecting these three convey paths is provided closer to the image forming location.

In the laser writing unit 46 and the electronic photography process unit 47, therefore, the laser writing unit 46 operates to scan a laser beam on the surface of the photosensitive drum 48 for forming the image data read out of the memory as an electrostatic latent image. A toner image visualized with toner is electrostatically transferred and fixed on one side of the paper conveyed from the multi-stage paper feeding unit 33. The paper on which the image is formed is conveyed from the fixing device 49 to the sorter 34 through the convey paths 50 and 57 or to the reversing convey path 50a through the convey paths 50 and 58.

Next, the description will be oriented to the construction and the function of the image processing unit included in the copying machine 30.

Figures 1, 1A:
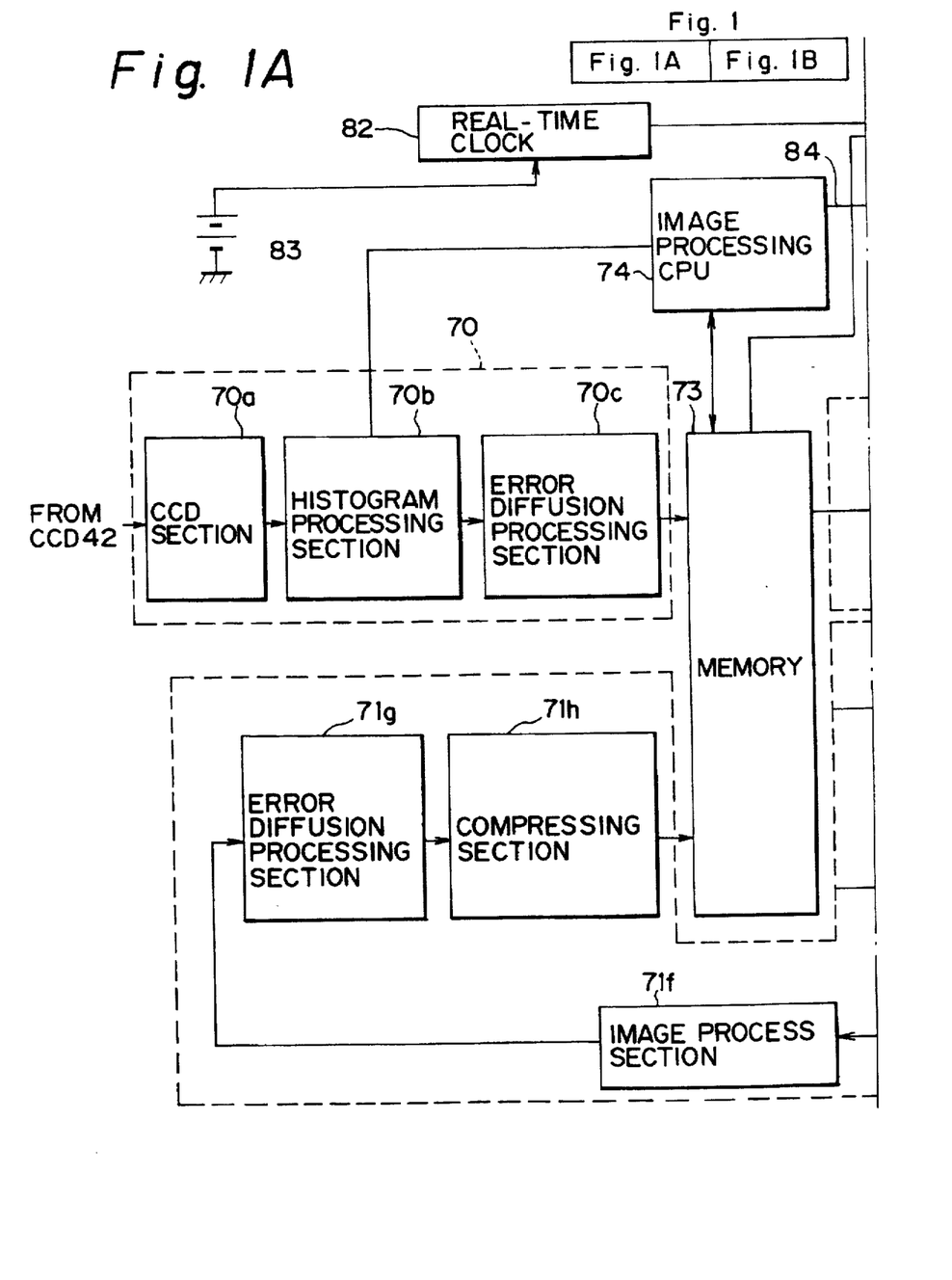
Figure 1B:
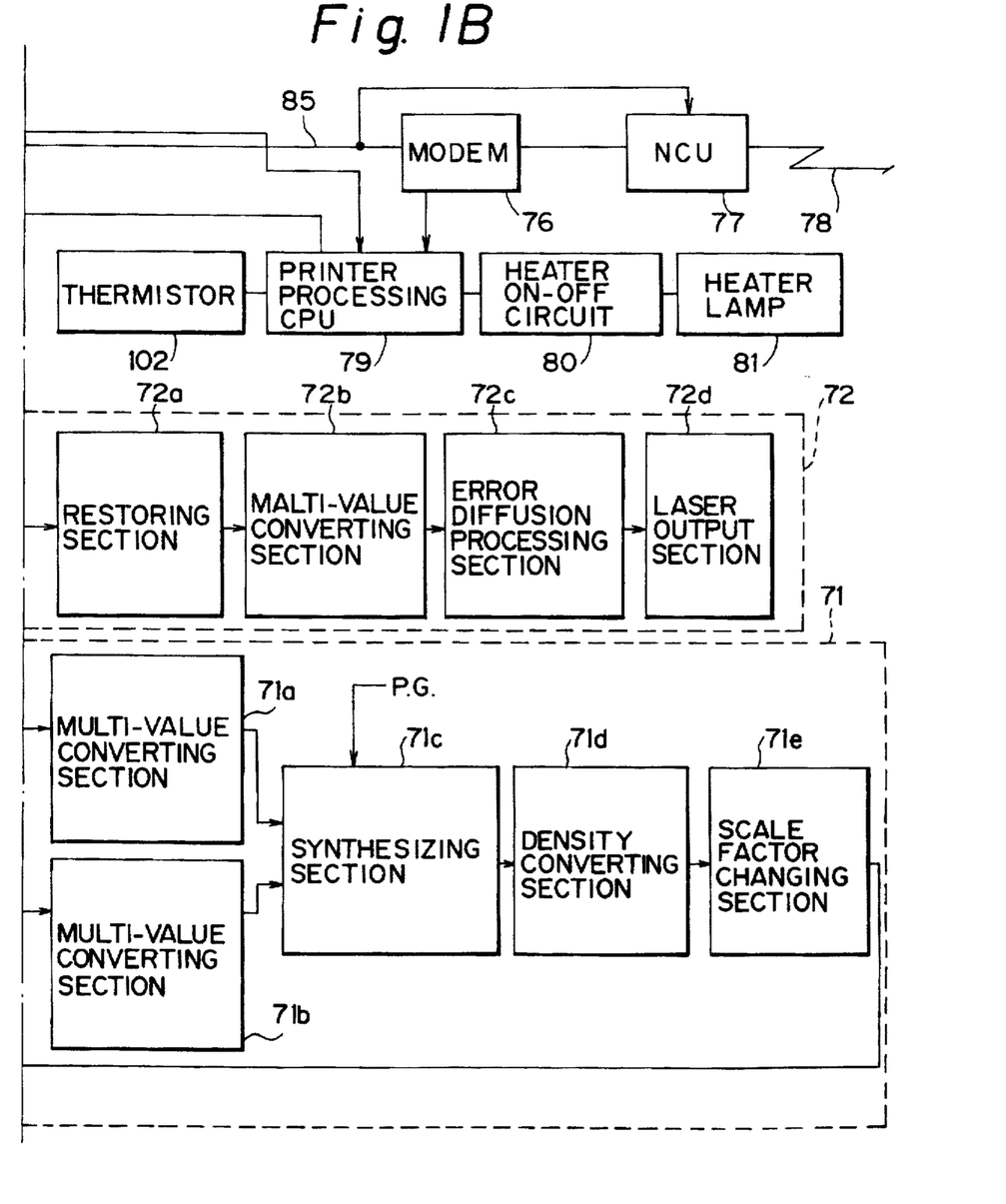

FIG. 1 is a block diagram showing an image processing unit and various control systems included in the copying machine 30 shown in FIG. 2.

The image processing unit included in the copying machine 30 provides an image data input unit 70, an image processing section 71, an image data output section 72, a memory 73 arranged of a RAM (Random Access Memory) and so on, and a central processing unit (CPU) 74 for processing an image.

The image data input unit 70 includes a CCD section 70a, a histogram processing section 70b and an error diffusion processing section 70c.

The image data input unit 70 operates to convert the image data of the document read from the CCD 42 shown in FIG. 2 into the binary data, process the image data through the effect of the error diffusion method as forming a histogram of the data as a binary digital amount, and temporarily store the processed image data in the memory 73.

That is, the CCD section 70a operates to analog-to-digital convert an analog electric signal formed according to each pixel density of the image data into the digital signal, perform an MTF correction, a monochrome correction or a gamma correction with respect to the digital signal, and output the processed signal to the histogram processing section 70b as a digital 256-tone (8 bit) signal.

The histogram processing section 70b operates to add the digital signal output from the CCD section 70a at each of 256-tone pixel densities for obtaining density information (histogram data) and send the obtained histogram data to the CPU 74 if necessary or send it to the error diffusion processing section 70c as the pixel data.

The error diffusion processing section 70c operates to convert a digital signal of 8 bit/pixel output from the CCD section 70a into one bit (binary) signal through the effect of the error diffusion method which is one kind of a pseudo halftone processing, that is, the method for reflecting an error concerned with conversion of the data into the binary determination of the adjacent pixel. Then, the binary data is subject to a redistributing operation for representing a local area density on the document with fidelity.

The image processing unit 71 includes multi-value converting sections 71a and 71b, a synthesizing section 71c, a density converting section 71d, a scale factor changing section 71e, an image processing section 71f, an error diffusion processing section 71g, and a compressing section 71h.

The image processing unit 71 is a processing unit for converting the input image data into the final image data desired by an operator. Until the final output image data is stored in the memory 73, the image data is being processed in this processing section. The foregoing processing sections included in the image processing unit 71 are operated if necessary. In some cases, they may not be operated.

That is, in the multi-value converting sections 71a and 71b, the data converted into the binary data in the error diffusion processing section 70c is converted into 256 tones again.

The synthesizing section 71c operates to selectively perform a logic operation for each pixel, such as a logic OR, a logic AND or an exclusive OR. The data to be operated is pixel data stored in the memory 73 and bit data sent from a pattern generator (PG).

The density converting section 71d operates to optionally set a relation between an input density and an output density with respect to data signals of 256 tones, based on a predetermined tone converting table.

The scale factor changing section 71e operates to perform an interpolation with respect to the input known data according to an indicated scale factor, for deriving pixel data (density value) against the scale factor changed pixel and changing the scale factor of the main scan after changing the scale factor of the sub scan.

The image process section 71f operates to perform various image treatments with respect to the input pixel data or collect the information such as features with respect to a data train.

The error diffusion processing section 71g performs the same processing as the error diffusion processing section 70c included in the image data input unit 70.

The compressing section 71h operates to compress the binary data by means of a coding operation referred to as run length coding. Moreover, with respect to compression of the image data, the compressing operation operates in the final processing loop when the final output image data is completed.

The image data output unit 72 includes a restoring section 72a, a multi-value converting section 72b, an error diffusion processing section 72c, and a laser output section 72d.

The image data output unit 72 operates to restore the compressed image stored in the memory 73 for converting it to the original 256-tone image data, perform an error diffusion about quadruple data for achieving a smoother halftone representation than the binary data, and transfer the data to the laser output section 72d.

That is, the restoring section 72a serves to restore the image data compressed by the compressing section 71b.

The multi-value converting section 72b serves to perform the same processing as the multi-value converting sections 71a and 71b included in the image processing unit 71. The error diffusion processing section 72c serves to perform the same processing as the error diffusion processing section 70c included in the image data processing unit 70.

The laser output section 72d operates to convert the digital pixel data into an on/off signal of a laser for switching on and off the laser, based on the control signal sent from a CPU 79 for controlling the printer.

The data to be processed in the image data input unit 70 and the image data output unit 72 is basically stored in the memory 73 in the form of binary data, for reducing the amount of the memory 73. The data may be quadruple data if the inferiority of the image data is considered. In addition, the CPU 74 for processing an image being connected to the memory is connected to the CPU 79 through a communication line 84.

In a facsimile apparatus, on the other hand, when the information is received from a calling facsimile apparatus through a phone line 78, an NCU 77, and a modem 76, the receipt signal is sent to the CPU 79 for controlling the printer unit. In response, the CPU 79 gives an order for preparing a memory for the image data (data sent from the modem) to the CPU 74 for processing an image through the communication line 84 so that the image data may be stored in the memory 73 through the data line 85.

Then, the image data is read out of the memory 73. According to the image data, the laser writing unit 46 is driven so that an electrostatic latent image corresponding to the received information may be formed on the surface of the photosensitive drum 48.

Before driving the laser writing unit 46, the surface of the photosensitive drum 48 is uniformly charged.

Next, the developing device serves to feed toner onto the electrostatic latent image formed on the photosensitive drum 48 so that a toner image may be formed on the corresponding portion of the surface. During this interval, the CPU 79 for controlling the printer as shown in FIG. 1 operates to feed a sheet of paper and drive the convey roller so as to feed the sheets of paper in the cassette to a resist roller 63.

The resist roller 63 operates to feed a sheet of paper between the photosensitive drum 48 and a transfer charger in synchronous to the rotation of the photosensitive drum 48. With this operation, the toner image on the photosensitive drum 48 is transferred onto the sheet of paper.

The paper on which the toner image is transferred is conveyed to the location where the fixing device 49 is. At this location, the fixing process is carried out with respect to the image-transferred paper. Then, the resulting paper is sent to the sorter 34 through the convey paths 50 and 57 and then to the reversing convey path 50a through the convey paths 50 and 58.

Figure 3:
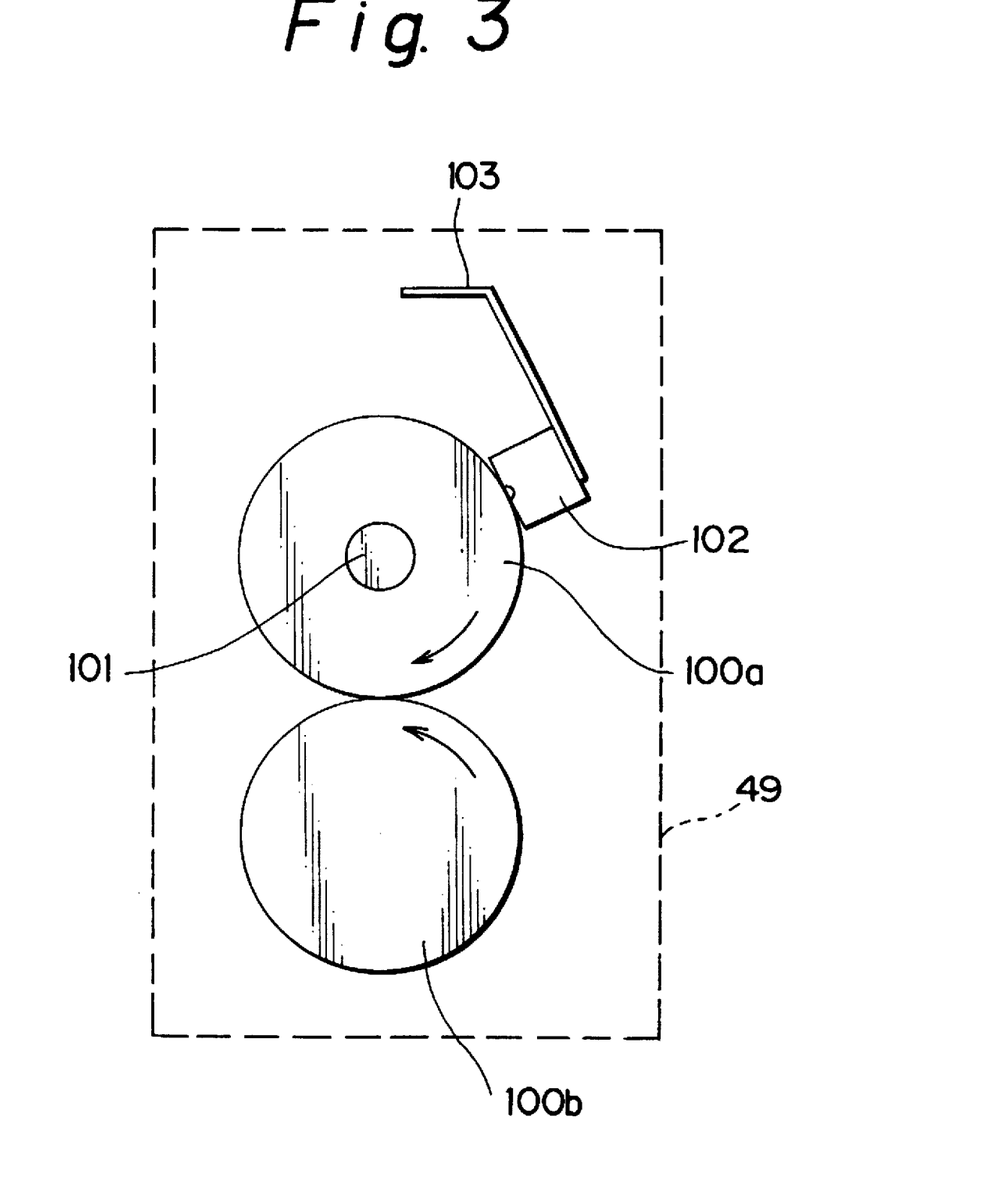
FIG. 3 is a view showing an essential part of a fixing device.

FIG. 3 shows the detail of the fixing device 49.

The fixing device 49 includes a pair of rollers consisting of an upper roller 100a and a lower roller 100b. Inside of the upper roller 100a, a heater lamp 101 is provided to heat the surface of the upper roller 100a up to a fixing temperature.

Inside of the upper roller 100a, a thermistor 102 is provided for detecting the temperature of the surface of the upper roller 100a. The thermistor 102 is supported by a spring device 103 in a manner to allow the thermistor 102 to constantly contact with the upper roller 100a with uniform pressure.

The thermistor 102 operates to output a voltage signal corresponding to the surface temperature of the upper roller 100a to the CPU 79 for controlling the printer. With this voltage signal, the CPU 79 for controlling the printer operates to issue a predetermined driving signal to a heater ON-OFF driving circuit 80 in a manner to set the surface temperature of the upper roller 100a to a fixing temperature by comparing the detection signal sent from the thermistor 102 and the reference voltage value.

The heater ON-OFF circuit 80 is equipped with a triac which uses a zero cross. In accordance with a driving signal sent from the CPU 79 for controlling the printer, the heater lamp 101 is heated so as to set the upper roller 100a, that is, the fixing device 49 to the fixing temperature.

On the other hand, as shown in FIG. 1, there is provided a real-time clock 82 connected to a battery power source 83. This is an IC having a calendar function, which may set values to year, month, day, and time. This IC is backed up by the battery irrespective of the ON-OFF of the power source 83 and operates to count the time.

The operation of this embodiment of the present invention will be described as referring to FIGS. 7 and 8.

Figure 7:
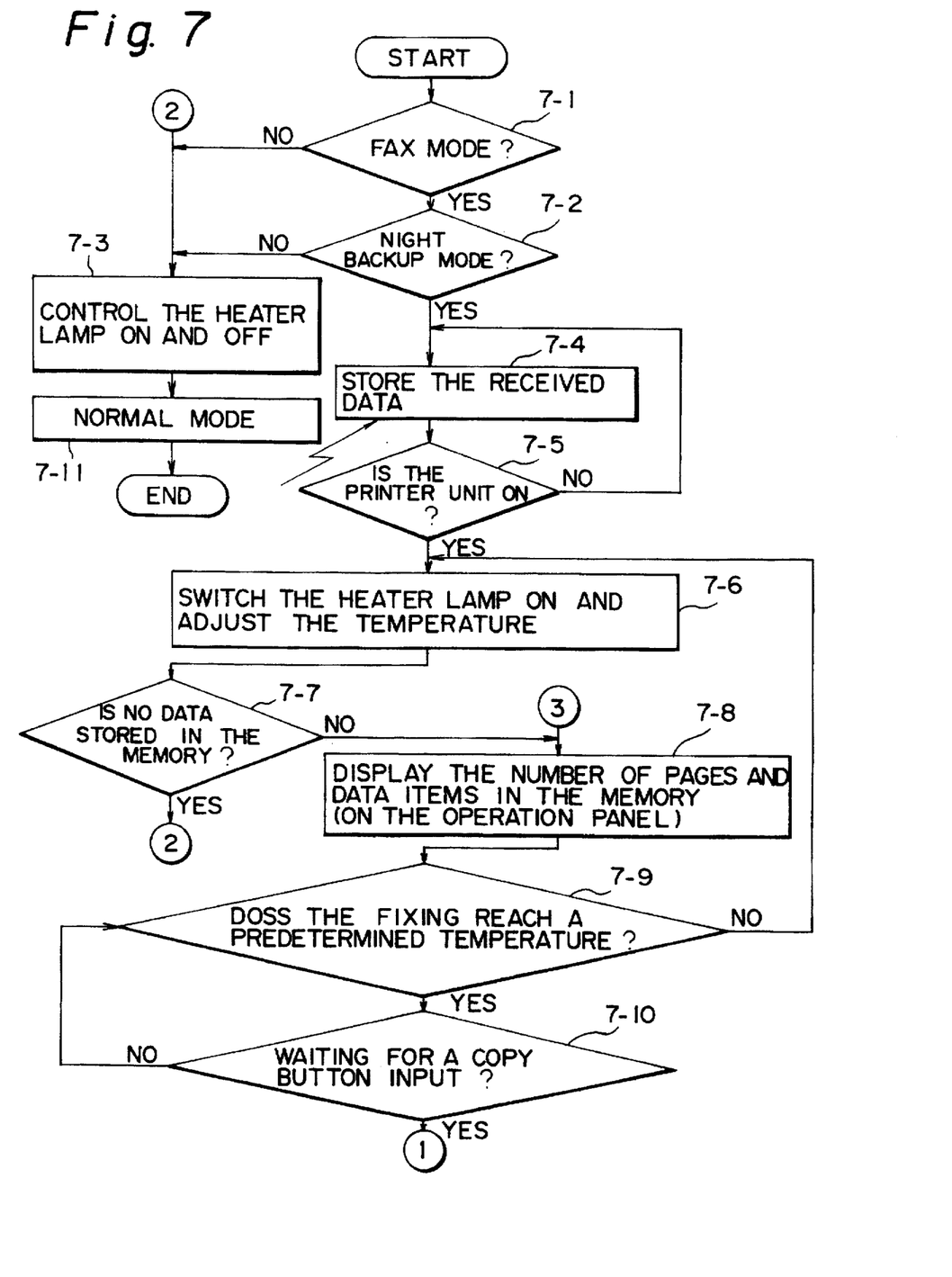
FIG. 7 is a flowchart for explaining a first operation to be done in the digital copying machine according to the embodiment of the present invention.
Figure 8:
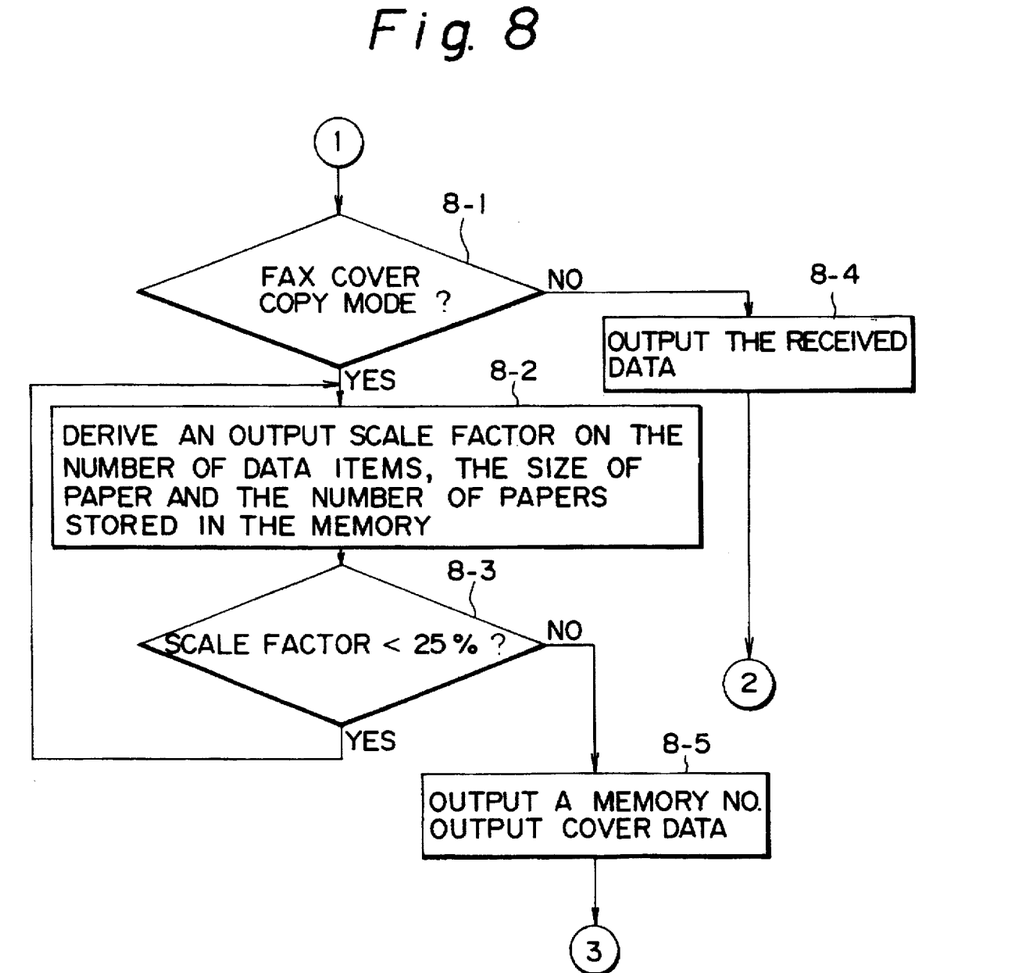
FIG. 8 is a flowchart for explaining the second operation to be done in the digital copying machine according to the embodiment of the present invention.

In FIG. 7, only at a night back-up mode (7-2) in the state of a facsimile mode (7-1), the received data of the facsimile is stored as image data in the memory (7-4).

When the power source of the printer is switched on (7-5), the copying machine enters into a warm-up state so that the heater lamp may be switched on for adjusting the temperature (7-6). When the printer power source is turned on, if no data is stored in the memory (7-7), after the ON-OFF control of the heater lamp is executed (7-3), an initial screen at the normal mode is displayed on an operation panel (7-11).

If any data is stored in the memory, the number of papers and the number of data items stored in the memory is displayed on the operation panel 202 (see FIG. 4) (7-8).

Figure 4:
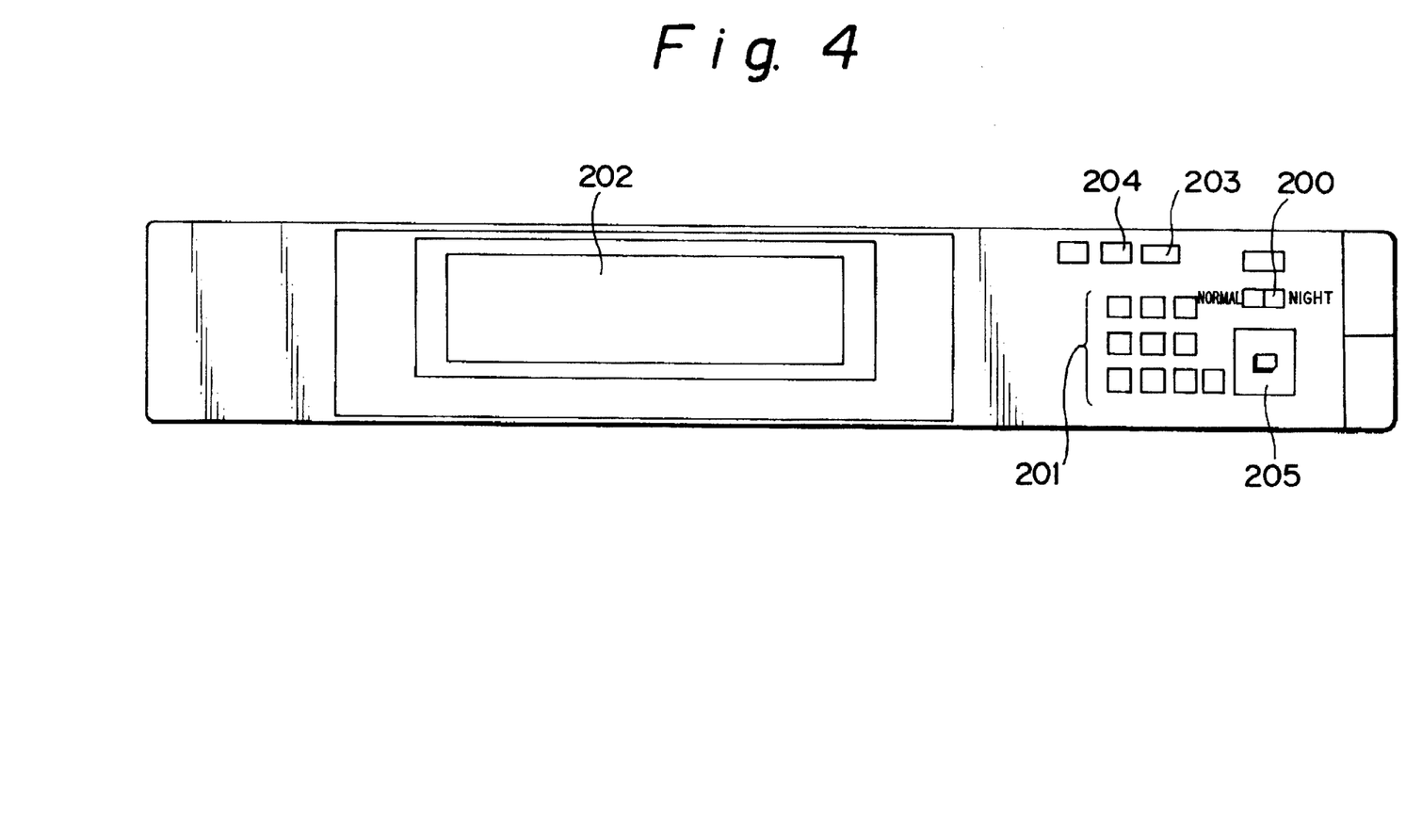
FIG. 4 is a view for explaining an operation panel.
Figure 5:
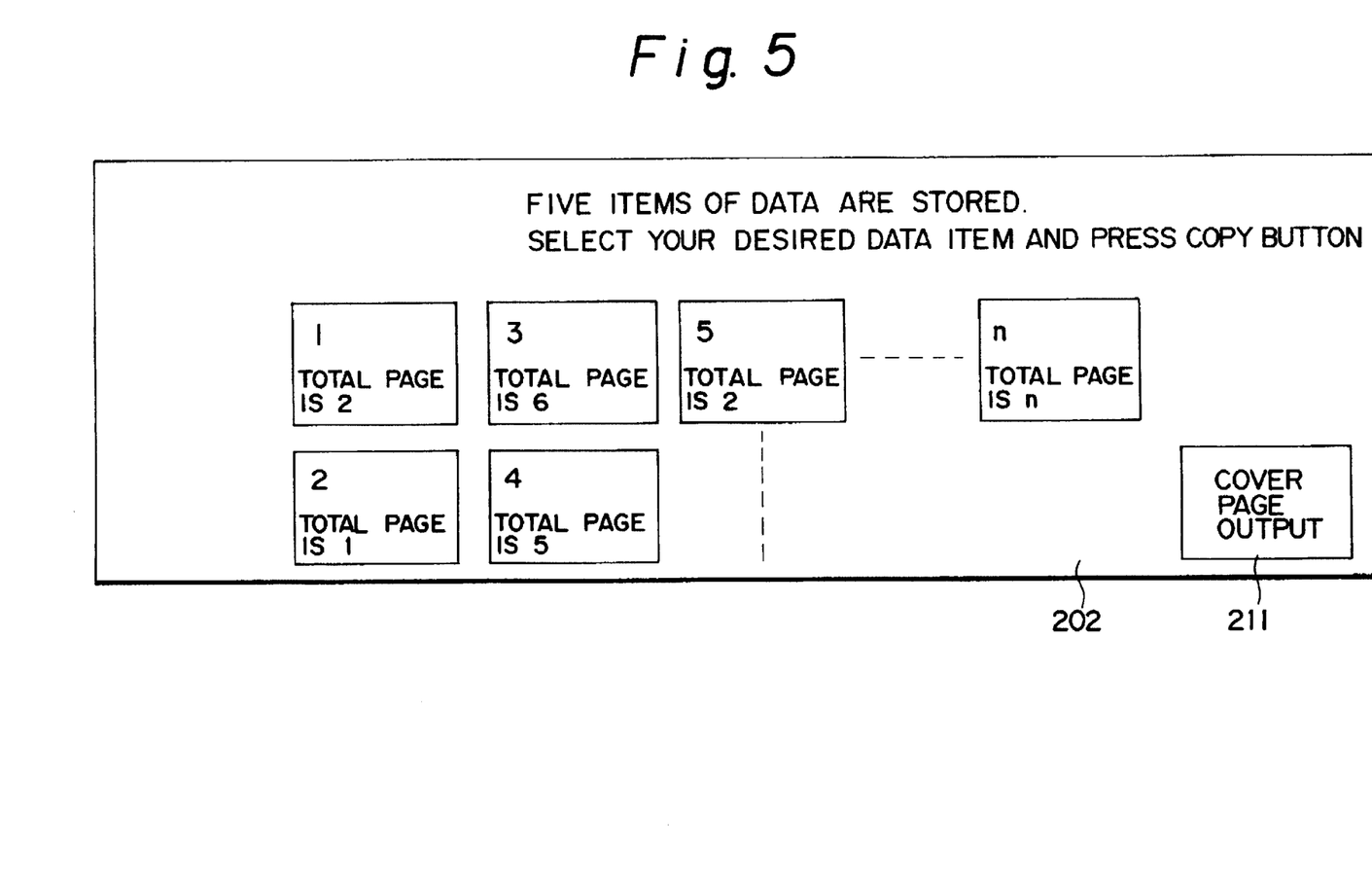
FIG. 5 is a view showing an initial screen appearing on the operation panel when the received data is stored.

At this time, the display shown in FIG. 5 appears on the operation panel 202 shown in FIG. 4. In FIG. 4, 200 denotes a switch for switching the night facsimile mode to the normal mode or vice versa. 201 denotes template keys. 202 denotes a display panel. 203 denotes an interrupt key. 204 denotes a clear key. 205 denotes a copy button.

As shown in FIG. 5, if a plurality of data items are stored in the memory, any one of the contents 1 to 5 may be selected for output. In a case that the cover page output 211 of this screen is selected and the predetermined temperature is achieved for fixing (7-9), the copy button 205 is pressed in a copy standby state (7-10). Or, if the mode is a cover copy mode of the facsimile (8-1), the CPU 74 for processing image serves to operate an output scale factor by referring to the number of data items stored in the memory, the size of the paper, and the number of the papers, automatically set a scale factor according to the size of paper (for example, A3) (no magnification) (8-2), and output the cover data pieces 220 to 224 numbered at the predetermined locations in the output form of the cover page output mode (8-5).

Figure 6:
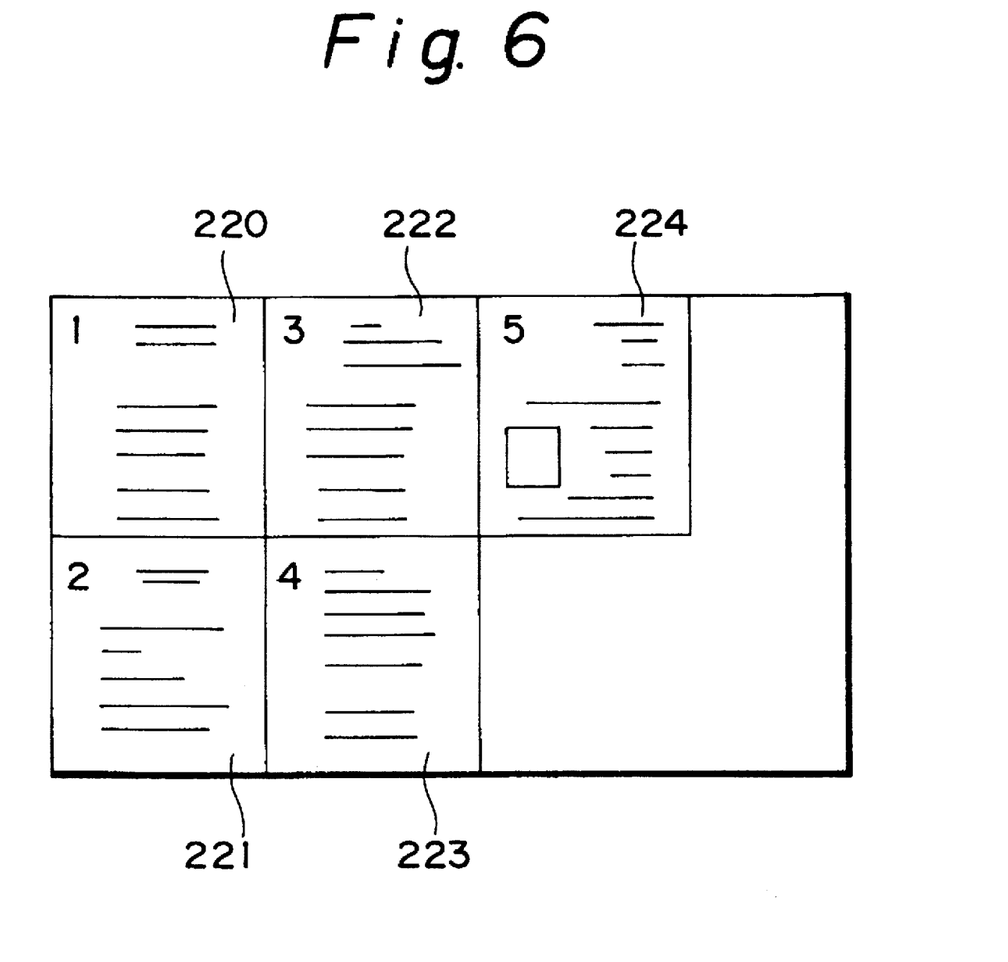
FIG. 6 is a view showing an output format example at a cover page output mode.

At this time, at the upper left of each cover, a memory number is automatically output. From this memory number, the content included in any number of facsimile data may be understood. This numbering is equal to that on the operation panel.

The data content is numbered in the earlier sequence of the transmitting time of the facsimile when it is output.

When the cover copy mode is selected, in a case that a scale factor (reducing factor) of the data to be printed is smaller than a predetermined value (for example, in a case of 25% or less, 8-3), the operation is executed to increase the number of sheets of the papers on which the cover pages are printed so as to keep the scale factor higher than a predetermined value (executed by the CPU 79 for controlling the printer). In the case that the scale factor of the data to be printed is larger than the predetermined value (25%), the cover data having the memory numbers at the upper left corners are output at the scale factor calculated by the CPU 74.

To output all the data stored in the memory, the image is allowed to be output by pressing the copy button without having to select any mode (8-4).

By using this mode, the summary of each facsimile can be obtained with ease. Further, by numbering the cover output data, it is possible to immediately output the data desired by an operator when the next operation is set.

Many widely different embodiments of the present invention may be constructed without departing from the spirit and the scope of the present invention. It should be understood that the present invention is not limited to the specific embodiments described in the specification, except as defined in the appended claims.

What is claimed is:

1. A digital copying machine comprising:
   a modem;
   an image data processing unit for processing image data;
   an image data input unit;
   memory means for storing a plurality of items of data received by said modem, each item containing one or more pages;
   control means for image data processing
   and for controlling printing of information in at least a cover page output mode in which content of cover pages for all items stored in said memory means is output in accordance with a reducing factor which is a function of a number of said stored items and a size of paper for printing in said cover page output mode;
   an image data output unit for outputting content of each item stored in said memory means and content of cover pages for all of the items stored in said memory means; and
   an operational panel including display means which display each item number and number of pages of each of the items stored in said memory means and selecting means for selecting said cover page output mode in which content of cover pages for all of the items stored in said memory means is output.

2. A digital copying machine according to claim 1, wherein said control means includes first control means which calculates reducing factor based on the number of said stored items and the size of paper to print thereon so as to synthesize said cover pages of said plural items on one sheet of paper.

3. A digital copying machine according to claim 2, wherein said control means includes second control means arranged to increase the number of sheets of paper to print thereon and to print on said sheets of paper the data corresponding to only cover pages of said plural items by a predetermined reducing factor if said reducing factor calculated by said first control means is smaller than said predetermined reducing factor.

* * * * *